United States Patent [19]

Mertz

[11] Patent Number: 5,143,965
[45] Date of Patent: Sep. 1, 1992

[54] MAGNESIUM HYDROXIDE HAVING FINE, PLATE-LIKE CRYSTALLINE STRUCTURE AND PROCESS THEREFOR

[75] Inventor: Steven F. Mertz, Ludington, Mich.

[73] Assignee: The Dow Chemical Company, Midland, Mich.

[21] Appl. No.: 633,818

[22] Filed: Dec. 26, 1990

[51] Int. Cl.[5] ............. C09C 1/02; C01F 5/08; C08K 3/10
[52] U.S. Cl. ............. 524/436; 106/461; 423/274; 423/635; 423/636; 423/638; 423/639
[58] Field of Search ............. 423/636, 639, 274, 635, 423/638; 106/461, 108; 501/109, 122; 524/436

[56] References Cited

U.S. PATENT DOCUMENTS

| | | | |
|---|---|---|---|
| 2,940,831 | 6/1960 | Nossardi et al. | 23/201 |
| 3,739,058 | 6/1973 | Periard | 423/161 |
| 4,098,762 | 7/1978 | Miyata et al. | 260/45.7 R |
| 4,695,445 | 9/1987 | Nakaya et al. | 423/639 |

FOREIGN PATENT DOCUMENTS

0214494 8/1986 European Pat. Off. .
62-30605 2/1987 Japan .

*Primary Examiner*—Wayne Langel
*Attorney, Agent, or Firm*—Andrew E. Pierce

[57] ABSTRACT

Novel magnesium hydroxide having a fine, plate-like crystalline structure, a median particle size of up to about 1 micron and a particle size distribution in which about 90% of said magnesium hydroxide particles are less than about 3.5 microns is prepared by a flash precipitation process in which less than or greater than an equivalent amount of alkaline material is reacted with a magnesium salt in a concentrated aqueous mixture thereof. Ultrasonic mixing means is used to combine heated aqueous streams of an alkaline material and a magnesium containing solution followed by a post heat treatment. The magnesium hydroxide is especially useful in providing flame retardancy in admixture with thermoplastic resins.

10 Claims, 2 Drawing Sheets

MAGNESIUM HYDROXIDE HAVING FINE, PLATE-LIKE CRYSTALLINE STRUCTURE AND PROCESS THEREFOR

BACKGROUND OF THE INVENTION

1. Field of the Invention

This invention relates to a particulate magnesium hydroxide useful in imparting flame retardancy to thermoplastic plastics.

2. Description of the Prior Art

Magnesium hydroxide can be produced by adding a water-soluble alkaline material to an aqueous solution of a magnesium salt at atmospheric pressure or slightly above and temperatures from slightly above room temperature to about 100 degrees centigrade or slightly higher. The precipitate which forms on standing forms small crystals whose largest dimension does not exceed about 5 microns and whose thickness is in the range of about 300 to about 900 angstrom units. Representative of prior art processes for the production of magnesium hydroxide are those processes disclosed in U.S. Pat. No. 3,739,058; U.S. Pat. No. 3,508,869; U.S. Pat. No. 2,940,831; and U.S. Pat. No. 3,080,215. A commercial magnesium hydroxide process will produce a particulate material having a size range of about 0.5 to 15 microns, with a median particle size of about 5-6 microns, 20% of the material being smaller than about 3 microns, and 20% being larger than about 9 microns. A typical milling operation might result in a product having a range of 0.1 to 10 microns, with a median particle size of about 1 micron, 20% of the material being smaller than about 0.55 microns, and 20% being larger than about 2.5 microns.

More recently, a magnesium hydroxide which is purported to be particularly suitable for use in combination with thermoplastic synthetic resins to provide flame retardancy has been disclosed in U.S. Pat. No. 4,145,404 and U.S. Pat. No. 4,098,762. Such magnesium hydroxide particles are flat plates typically 0.3-1 micron across with smooth and faceted edges. The thickness of the individual flat plates is typically 500-1500 Angstroms. In addition, Japanese patent disclosure 62-30605, Feb. 9, 1987 to Kinouchi et al. disclose a process for the production of a magnesium hydroxide fine powder utilizing ultrasonic mixing of a water-soluble salt of magnesium and an alkali solution. European Patent Application 0214 494 to Asahi Glass Co. also discloses the preparation of magnesium hydroxide using ultrasonic mixing means.

The use of inorganic fillers such as magnesium hydroxide to provide flame retardancy in thermoplastic resins is disclosed in U.S. Pat. No. 4,067,847; U.S. Pat. No. 4,396,730, and U.S. Pat. No. 4,126,593.

None of these prior art references disclose magnesium hydroxide particles structurally characterized by a predominant fine plate-like particle form having an average particle size of about 0.2 to about 0.4 micron The particles are prepared by a continuous mixing process, as disclosed herein.

The particulate magnesium hydroxide of the invention is particularly suited for use in conjunction with thermoplastic synthetic resins to provide flame retardancy thereto. In this application, the solid particles of magnesium hydroxide can be utilized subsequent to coating with a surfactant or can be utilized without any coating thereon.

DETAILED DESCRIPTION OF THE INVENTION

Figure 1:
FIGS. 1 and 2 are reproductions of photographs taken magnified 10,000 and 30,000 times, respectively, of a sample of magnesium hydroxide produced in the continuous process of the invention.
Figure 2:
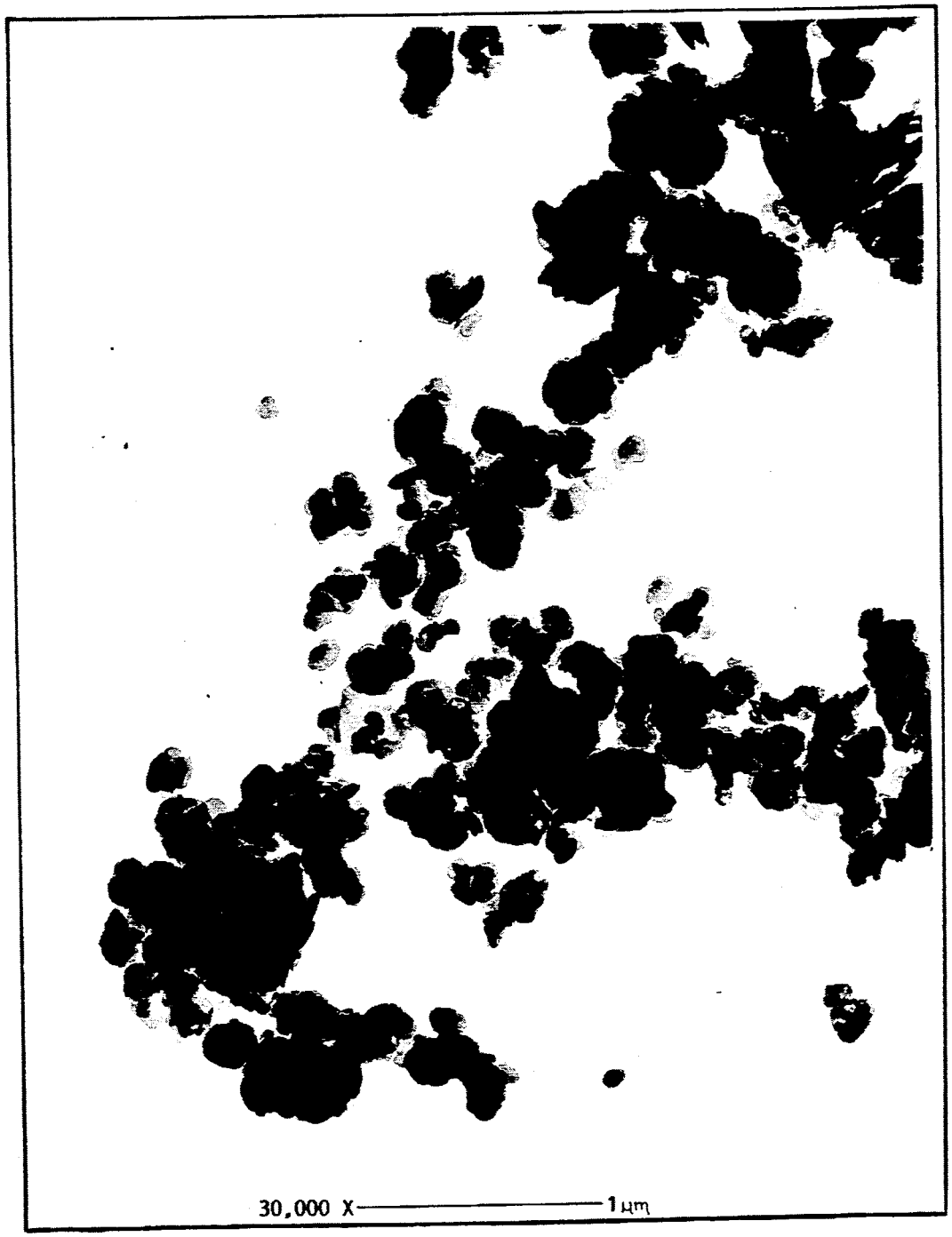

The method of preparing the novel particulate, crystalline structure magnesium hydroxide characterized predominantly by fine plate-like particle form comprises mixing using ultrasonic mixing means, a heated or ambient temperature aqueous solution of a magnesium salt with a heated or ambient temperature solution or dispersion of an alkaline material to cause "flash" precipitation of the magnesium hydroxide and post treating the resulting mixture at ambient pressure and elevated temperature. The temperature used for heating the reactants when heated during flash precipitation and the post treatment of the resulting mixture is between about 40 degrees centigrade and about 120 degrees centigrade, preferably, about 50° C. to about 100° C., and most preferably, about 5° C. to about 80° C. At temperatures of less than 40 degrees centigrade, the reaction time is unsatisfactorily slow during the post treatment.

In the process of the invention, less than an equivalent amount of an alkaline material is mixed using ultrasonic mixing means at ambient pressure and at ambient or elevated temperature in an aqueous medium with a magnesium containing salt and the mixture post treated by reacting at elevated temperature and at ambient pressure to precipitate magnesium hydroxide. Alternatively, in the process of the invention, less than an equivalent amount of a magnesium containing salt is mixed using ultrasonic mixing means in an aqueous medium at ambient pressure and at ambient or elevated temperature with an alkaline material and post treated by reacting at elevated temperature and ambient pressure to convert the magnesium containing salt to magnesium hydroxide.

Generally, the alkaline material and the magnesium salt reactants are combined in the proportion of about 0.7 to about 1.30 equivalent of one of said reactants per equivalent of the other of said reactants, preferably, a proportion of about 0.85 to about 1.15 equivalent, and most preferably, about 0.95 to about 1.05 equivalent. In the processes of the invention, the reactants (alkaline material and magnesium containing salt) are present in a high concentration. Generally, the reactants are present at a total solids content of about 20 to about 60% by weight based upon the total weight of reactants and aqueous medium, preferably, the total solids of reactants is about 20 to about 45% by weight, and most preferably, about 25 to about 35% by weight.

Generally, the post treatment reaction at elevated temperature is continued for about 1 to about 4 hours, preferably, about 1 to about 3 hours, and, most preferably, about 1 to about 2 hours. Thereafter, the precipitated magnesium hydroxide is separated by filtration or other convenient means from the aqueous medium and from the soluble salts dissolved therein. Washing the precipitate with water and subsequent re-filtration may be necessary to appropriately reduce the concentration of residual salts associated with the precipitated magnesium hydroxide. Generally, the residual soluble salt concentration is reduced to about 0.05% by weight to about 5% by weight, preferably about 0.1% to about 2% by weight and, most preferably, about 0.2% to about 1% by weight.

Should it be desirable to reduce the specific surface area of the particulate magnesium hydroxide of the invention, the magnesium hydroxide, subsequent to reaction, filtration, and washing, the magnesium hydroxide may be redispersed in water and further reacted in a second post reaction by heating at elevated temperature. The reaction mixture concentration, temperature, and time for reaction are the same as previously indicated for the initial precipitation reaction. A substantial reduction in specific surface area is obtained by this post reaction, provided the magnesium hydroxide is reacted in a second post reaction in an aqueous medium which is substantially free of dissolved salts. Generally, a soluble salt concentration of about 0.05% to about 5% by weight, preferably about 0.1% to about 2% by weight, and, most preferably, about 0.2% to about 1% by weight soluble salt concentration is required in the reactant mixture during the second post reaction. The particulate magnesium hydroxide of the invention produced by the continuous process of the invention is characterized, generally, by a predominant fine plate-like crystalline structure, a median particle size of up to about 1 micron, and a particle size distribution in which about 90% of the magnesium hydroxide particles are less than about 3.5 microns, about 50% are less than about 1 micron, and about 20% are less than about 0.7 micron.

Any magnesium salt which is soluble in water can be used for making the $Mg(OH)_2$ of this invention by the procedure defined above. Representative inorganic magnesium salts are $MgF_2$, $MgCl_2$, $MgBr_2$, $MgI_2$, $MgBrO_3$, $MgBrO_4$, $MgClO_3$, $MgClO_4$, $MgCrO_4$, $MgFeO_4$, $MgSO_4$, $MgSO_3$, organic acids can also be used, provided they are water soluble. Representative salts of organic acids include those of fatty acids having from 1 to about 6 carbon atoms, such as magnesium formate, acetate, propionate, butyrate, pentanoate, hexanoate, citrate or a salt of an aromatic acid such as magnesium benzoate, salicylate and phthalate.

The preferred magnesium salts are those of sulfuric, nitric and hydrochloric acid, the most preferred salt being $MgCl_2$, because of its ready availability from sources all over the world.

Preferably, the magnesium salt is a brine comprising an aqueous solution of an alkali metal or an alkaline earth metal halide salt including magnesium chloride. More specifically, both natural and synthetic brines which contain at least about 15 total weight percent of the chlorides of magnesium and calcium are preferred. The brine usually contains at least 2% by weight of magnesium chloride.

The alkaline material can an amine or a slaked calcined dolomite or an alkali or alkaline earth metal hydroxide or mixtures thereof.

The use of calcined dolomite in the production of magnesium hydroxide has certain inherent advantages over the use of calcined limestone. Among such advantages are the high yield of magnesium hydroxide when dolomite is employed since, when calcined, it contains about 1 mole of MgO per mole of CaO and, therefore, when reacted with a magnesium chloride-containing brine and the magnesium oxide becomes hydrated, it yields substantially two times the amount of magnesium hydroxide which would be produced from the reaction of calcined limestone with an equal quantity of the brine. Dolomite is relatively plentiful, being found in a substantially high degree of purity, and is often located conveniently near natural brine sources, as for example, in the state of Michigan, U.S.A.

Disadvantages, however, have heretofore been associated with the production of magnesium hydroxide as a precipitate employing dolomite as a raw material, salient among which have been its poor filterability when separating it as a filter cake from the mother liquor and when dewatering it following washing or following reslurrying of the washed cake. The low solids, i.e., the low density of the filter cake produced during filtration (often as low as 30–35 percent solids) is also undesirable and particularly undesirably is the high contamination of the product produced from water-slaked dolime unless promptly used, particularly calcium contamination, which has also been associated with contamination of the magnesium hydroxide precipitate from ingredients present in the brine, especially chlorides and borates. Dewatering refers to the step of concentrating an aqueous slurry of magnesium hydroxide, this step being commonly carried out by employing a rotary vacuum filter.

Among the larger uses of magnesium hydroxide is the manufacture of periclase-type refractory products which cannot tolerate an appreciable contamination of the magnesium hydroxide. Difficulties arising from contamination by calcium have been particularly troublesome. As much as 1.5 percent calcium oxide in the ignited magnesium hydroxide product is generally considered a maximum contamination for commercial acceptance and not more than 1 percent CaO is preferred. A number of large deposits of dolomite are substantially pure, e.g., the Cedarville quarries of Michigan, which by analysis shows this deposit to consist of about 1.03 moles of $CaCO_3$ per mole of $MgCO_3$ with a small percent of inerts. The only concern regarding contamination in the use of such dolomite as a source material is calcium contamination of the magnesium hydroxide.

In addition to a conventional batch process of precipitation, the magnesium hydroxide of the invention can be prepared utilizing ultrasonic mixing means preliminary to heating the mixture to complete the conversion reaction or precipitation of magnesium hydroxide. Precipitation of magnesium hydroxide utilizing ultrasonic vibration means is further described in U.S. Pat. No. 2,940,831, incorporated herein by reference.

If desired, the magnesium hydroxide of the invention may be treated with an anionic surfactant to form solid particles of magnesium hydroxide coated with the surfactant. This form of the magnesium hydroxide of the invention is more preferred when using it as a flame retardant or flame-retarding filler for thermoplastic resins or in water-soluble paints. The coating process can be performed by contacting the magnesium hydroxide with an anionic surfactant or by contacting either or both the reactants with an anionic surfactant prior to the production of the magnesium hydroxide of the invention. For example, an aqueous solution of a desired amount of an anionic surfactant is mixed with solid particles of the magnesium hydroxide under conditions such that they contact each other intimately, for example, by agitating them sufficiently, or by thermal treatment of an aqueous slurry at about 120 to about 250 degrees C. A solid powder of magnesium hydroxide coated with the anionic surfactant is formed upon removal of water. The surfactant is chemically adsorbed onto the surface of the solid particles of the magnesium hydroxide. This can lead to improved properties (as compared to uncoated magnesium hydroxide) when the magnesium hydroxide is incorporated in thermoplastic synthetic resins or in water-soluble paints. The amount of the anionic surfactant to be applied as a coating can be adjusted for optimum results. Solid magnesium hydroxide powder of this invention coated by using an aqueous surfactant solution containing about 5 millimoles to about 30 millimoles per liter of water, of the surfactant is preferred. For example, the amount of the anionic surfactant adsorbed onto the solid particles of the magnesium hydroxide of this invention is preferably about ½ to about 3 times, more preferably about 1 to about 2.5 times, the amount (X in millimoles) required to coat the entire surface of the solid particles (one gram) with a monolayer of the surfactant molecules. The amount X (millimoles) can be calculated in accordance with the following equation.

$$X = \frac{Y}{6.02 \times C} \text{ (millimoles)}$$

wherein C is the absolute value of the adsorption cross-sectional area $[(A)^2]$ per molecule of the anionic surfactant used and Y is the absolute value of the specific surface area $(m^2/g)$ of the magnesium hydroxide of this invention.

According to this invention, there can be provided a composition containing uncoated magnesium hydroxide of this invention or the magnesium hydroxide of this invention coated with an anionic surface active agent. For example, compositions having improved properties, especially those useful for melt shaping, can be provided by incorporating the coated or uncoated magnesium hydroxide of this invention in a thermoplastic synthetic resin, preferably those having great hydrophobicity and great non-polarity, as a flame retardant or flame-retarding filler in an amount of about 50 to about 250 parts by weight per 100 parts by weight of the resin. Examples of the thermoplastic synthetic resin include styrene resins such as a homo- or co-polymers of styrene, olefin resins such as homo- or co-polymers of olefins, polyester resins, polycarbonate resins, nylon resins, acetal resins, and blends of these resins. These compositions may be provided in the form of melt-shaped articles. Furthermore, by incorporating the coated or uncoated magnesium hydroxide of this invention in paints or lacquers in an amount of about 5 to about 150 parts by weight per 100 parts by weight of the resin vehicle, paint compositions having improved properties can be obtained.

Various conventional additives may further be incorporated in the thermoplastic synthetic resin composition or in paint compositions in accordance with this invention.

Examples of these additives are coloring agents (organic and inorganic pigments) such as isoindolinone, cobalt aluminate, carbon black, or cadmium sulfide, other fillers such as calcium carbonate, alumina, zinc oxide or talc; antioxidants such as 2,6-di-t-butyl-4-methylphenol, 2,2'-methylenebis (4-methyl-6-t-butylphenol), dilauryl thiodipropionate or tridecyl phosphite; ultraviolet absorbers such as 2-hydroxy-4-methoxy benzophenone, 2(2'-hydroxy-5'-methylphenyl) benzotriazole, 2-ethylhexyl-2-cyano-3,3-diphenyl acrylate, phenyl salicylate or nickel-bisoctyl phenyl sulfide; plasticizers such as di-2-ethyl hexyl phthalate, di-n-butyl phthalate, butyl stearate, or epoxidized soybean oil; and lubricants such as zinc stearate, calcium, aluminum and other metal soaps, or polyethylene wax.

These additives can be used in customary amounts. For example, the amount of the coloring agent is about 0.1 to about 3 parts by weight; the amount of the other filler is up to about 20 parts by weight; the amount of the antioxidant or ultraviolet absorber is about 0.001 to about 5 parts by weight; the amount of the plasticizer is up to about 20 parts by weight; and the amount of the lubricant is up to about 10 parts by weight. All these amounts are based on 100 parts by weight of the resin component.

The anionic surface active agent (surfactant) used to coat the magnesium hydroxide of this invention includes, for example, alkali metal salts of higher fatty acids of the formula

RCOOM wherein R is an alkyl group containing 8 to 30 carbon atoms, and M is an alkali metal atom, alkyl sulfate salts of the formula

$ROSO_3M$ wherein R and M are the same as defined above, alkylsulfonate salts of the formula

$RSO_3M$ wherein R and M are the same as defined above, alkylaryl sulfonate salts of the formula

R—aryl—$SO_3M$ wherein R and M are the same as defined above, and sulfosuccinate ester salts of the formula

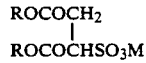
$$\begin{array}{l} ROCOCH_2 \\ | \\ ROCOCHSO_3M \end{array}$$

wherein R and M are the same as defined above. These anionic surfactants can be used either alone or in admixture of two or more.

Specific examples of the surface active agent are sodium stearate, potassium behenate, sodium montanate, potassium stearate, sodium oleate, potassium oleate, sodium palmitate, potassium palmitate, sodium laurate, potassium laurate, sodium dilaurylbenzenesulfonate, potassium octadecylsulfate, sodium laurylsulfonate or disodium 2-sulfoethyl α-sulfostearate.

Alternatively, the magnesium hydroxide of the invention can be coated with a fatty acid ester of a polyhydric alcohol. For some purposes, such coating is superior to the use of a coating of an anionic surface active agent such as an alkali metal salt of a higher fatty acid. The polyhydric alcohol can have 2 to 6 hydroxyl groups and is represented by such compounds as ethylene glycol, propylene glycol, glyceryl, trimethylolpropane, pentaerythritol and dipentaerythritol. Of these polyhydric alcohols, those of the neopentyl series such as dipentaerythritol, pentaerythritol, and trimethylolpropane, are preferable in view of their stability at high temperatures. A saturated fatty acid having 4 to 24 carbon atoms, preferably, a saturated straight chain fatty acid having 8 to 18 carbon atoms or a mixture of acids having the above defined carbon atoms on the average can advantageously be used as the fatty acid constituent. The fatty acid ester of the polyhydric alcohol can be a completely esterified compound wherein all hydroxyl groups in the starting polyhydric alcohol are esterified or a partial ester, wherein only a part of the hydroxyl groups are esterified.

The use of magnesium hydroxide in thermoplastic polymer materials has replaced the prior use of a mixture of antimony trioxide and a halide compound such as a vinyl chloride resin as additives useful for incorporating flame retardancy in thermoplastic materials. This is because the use of magnesium hydroxide in thermoplastics as a flame retardant results in thermoplastic composites which emit less smoke and less toxic smoke as compared to thermoplastic composites containing halogenated flame retardant additives. The prior art use of a combination of antimony trioxide and a halide as flame retardant additives in a thermoplastic material also results in the evolution of a halogen gas during the molding operation utilized to form specific objects from the thermoplastic resins so compounded for flame retardancy. The evolution of halogen gas leads to the corrosion of molding machines and metal molds and results in a toxic environment for workers involved in the molding operation. The incorporation of magnesium hydroxide in thermoplastic materials to provide flame retardancy is superior in accomplishing the desired result without the deleterious effect of the evolution of a halogen gas during the molding operation.

Suitable thermoplastic resins for use with the magnesium hydroxide of this invention include: polypropylene, propylene-ethylene copolymer, polyethylene, ethylenepropylene copolymer, ethylenevinyl acetate copolymer, polystyrene, acrylonitrile-butadiene-styrene copolymer, acrylonitrile-styrene copolymer and the like. Especially suitable are polyolefins such as polypropylene, propylene-ethylene block or random copolymers, high-density or low-density polyethylene and the like.

The continuous precipitation process for the preparation of a fine particle size magnesium hydroxide utilizing ultrasonic mixing means produces a very small, uniformly-sized, smooth crystal which can be prepared coated with an appropriate anionic surfactant to prevent agglomeration or can be prepared without surfactant. Many commercial processes for the precipitation of magnesium hydroxide result in rough particles which are either the result of random crystal growth over the surface of the particle or the result of agglomeration of the particles in which small crystals grow into larger particles. The use of ultrasonic mixing means in the preparation of the magnesium hydroxide particles of the invention results in the preparation of small crystals which remain small and unagglomerated. In addition to producing the very small, uniformly-sized, smooth crystals by the process of the invention, the use of ultrasonic mixing means in the preparation of the magnesium hydroxide of the invention results in the production of a magnesium hydroxide having a narrow particle size distribution that is more uniform than can be obtained utilizing batch precipitation processes or can be obtained by grinding formed particles of magnesium hydroxide.

The apparatus utilized to mix by ultrasonic means, the dual aqueous process streams of alkaline material and magnesium containing salt was a Model A, dual-feed ultrasonic mixing device sold under the trade name SONOLATOR by the Sonics Corporation. The apparatus consists of two high pressure metering pumps, one of which is used to supply the alkaline material, and the other of which is used to supply the magnesium salt containing aqueous solution to a small discharge chamber which is located upstream of an orifice. A small tube inside the mixing chamber is utilized to transport the alkaline material to the orifice and the brine flows to the orifice through an annulus which surrounds the tube. Mixing occurs instantaneously as the two fluids pass through the orifice of the ultrasonic mixing machine. The pressure upstream of the orifice is 300-700 pounds per square inch. The jet stream of magnesium salt aqueous solution or alkaline material aqueous solution or slurry impinges on a hardened steel or tungsten carbide blade as the reactant stream exits the orifice. The purpose of the hardened steel or tungsten carbide blade is to create ultrasonic excitation. Subsequent to mixing, the liquids exit the ultrasonic mixing chamber through a back pressure valve which serves to keep the chamber full of liquid.

As supplemental apparatus to the use of the ultrasonic precipitation mixing devise, a feed tank for the alkaline solution or slurry and a feed tank for the magnesium salt containing aqueous solution were provided. These feed tanks are provided with a steam coil in order to preheat the reactant aqueous mixtures prior to ultrasonic mixing. Subsequent to mixing the reactants in the ultrasonic mixing apparatus, the mixed reactants were placed in a vessel in which they were post treated by heating. After heating in the post treatment, the magnesium hydroxide slurry was drained from the post treatment vessel and held at ambient temperature prior to filtration and washing. When the alkaline material is a lime slurry containing calcium hydroxide and magnesium hydroxide, the lime slurry was first prepared as a reactant by grinding it in a small Morehouse mill. This mill is sometimes referred to as a Colloid mill. In this mill, the grinding of the particles is accomplished as the fluid containing particles are passed between rotating and fixed abrasive grinding disks. The lime slurry was prepared in this manner in order to eliminate gritty solids which would damage the lime pump or plug the orifice in the ultrasonic mixing apparatus. Subsequent to grinding, the lime slurry was transferred to a feed tank. In the following examples where the surface active agent is added to the alkaline material reactant (lime slurry) and the brine solution, the surface active agent was mixed with the reaction mixture in a feed tank.

The following examples illustrate the various aspects of the invention but are not intended to limit its scope. Where not otherwise specified throughout this specification and claims, temperatures are given in degrees centigrade and parts, percentages, and proportions are by weight.

EXAMPLE 1

An aqueous lime slurry containing 23 percent by weight calcium hydroxide and 17 percent by weight magnesium hydroxide and having a total solids content of 40.5% by weight was pretreated with an anionic surfactant sold under the trade name Silwet 7604 at a ratio of 1.3 grams surfactant per gallon of lime slurry by mixing the lime slurry with the surfactant for 30 minutes. Silwet is sold by the Union Carbide Corporation.

An aqueous brine solution containing 8.9% by weight magnesium chloride, 17% by weight calcium chloride, 0.9% by weight sodium chloride, and lesser amounts of other salts including those of strontium, lithium, boron, and iron having a total solids content of 27.8% by weight was similarly treated with Silwet 7604 (an organo modified polydimethyl siloxane) anionic surfactant at a ratio of 1.3 grams of surfactant per gallon of brine solution utilizing the process described above.

The anionic surfactant treated lime slurry was pumped into the ultrasonic mixing apparatus described above. Similarly, the anionic surfactant brine solution was pumped from a vessel containing the brine solution to the ultrasonic mixing apparatus. The "Model A" Sonolator used as an ultrasonic mixing means was set at a pressure of 400 psi. The ratio of the speed of the pump used to pump the brine solution into the ultrasonic mixing chamber over that speed of the pump used to pump the lime slurry into the ultrasonic mixing chamber was 3.5, which is equivalent to providing a 14% excess of brine solution to the lime slurry. The amount of lime slurry utilized to combine with the brine was 0.9 equivalent. Subsequent to ultrasonic mixing, the reaction mixture was transferred to a post treatment mixing tank and heated for 2 hours at 105° C. The precipitated magnesium hydroxide was recovered from the aqueous medium by filtration and washing of the precipitate to remove salts.

Upon analysis, the magnesium hydroxide particles recovered from this continuous process were found to have a median particle size of about 0.7 micron, as determined with a Micromeritics Sedigraph which combines the principle of sedimentation with X-ray detection in order to obtain this measurement of particle size. About 80% of the particles are within about 0.3 to about 1.4 microns. The particles are characterized as consisting predominantly of individual plate-like formed particles many of which are 0.25 to 0.3 micron in width. Each of the particles is a single crystal of magnesium hydroxide having a unit layer thickness of 30-200 Angstroms. Electron diffraction patterns recorded from individual particles show that the crystal structure of these particles is brucite, a known form of magnesium hydroxide.

EXAMPLE 2

Example 1 was repeated except that the lime slurry and the brine solution were not treated with an anionic surfactant prior to mixing by ultrasonic means and heating to precipitate the magnesium hydroxide. The resulting magnesium hydroxide particles upon determination of particle size in accordance with the method utilized in Example 1, had a median particle size of about 0.8 micron and substantially similar morphology.

EXAMPLE 3

Example 1 is repeated except that the lime slurry and the brine solution are heated to 71° C. prior to mixing by ultrasonic means. Substantially similar median particle size and morphology are obtained in comparison with that obtained in Example 1.

EXAMPLE 4

Example 3 is repeated except that the lime slurry and the brine solution are not treated with an anionic surfactant prior to mixing and heating to precipitate the magnesium hydroxide. Substantially similar median particle size and morphology are obtained as compared to Example 1.

While this invention has been described with reference to certain specific embodiments, it will be recognized by those skilled in the art that many variations are possible without departing from the scope and spirit of the invention. It will be understood that it is intended to cover all changes and modifications of the invention disclosed herein for the purposes of illustration which do not constitute departures from the spirit and scope of invention.

The embodiments of the invention in which an exclusive property or privilege is claimed are defined as follows:

1. A process for the production of a magnesium hydroxide having a particulate, crystalline structure characterized predominantly as having a fine, plate-like form and a median particle size of about 0.7 micron to about 1 micron, a unit layer thickness of 30 to 200 Angstroms, and a particle size distribution in which 80% of said particles are within about 0.3 to about 1.4 microns comprising:
    (A) mixing by ultrasonic mixing means at ambient pressure and ambient or elevated temperature an aqueous alkaline material reactant selected from the group consisting of an amine, an alkaline earth metal hydroxide, and an alkali metal hydroxide and an aqueous magnesium containing salt reactant to produce an aqueous reactant mixture which comprises about 20 to about 70% by weight of a mixture of reactants comprising said alkaline material and a magnesium containing salt and
    (B) post heat treating said aqueous reactant mixture at ambient pressure to precipitate said magnesium hydroxide.

2. The process of claim 1, wherein said aqueous reactants, heated prior to mixing, and said post heat treating is conducted at about 80° C. to about 120° C.

3. The process of claim 2, wherein said aqueous reactants are heated at a temperature of about 40° C. to about 120° C. prior to mixing by ultrasonic means and said magnesium containing salt is an inorganic magnesium salt selected from the group consisting of magnesium fluoride, magnesium chloride, magnesium bromide, magnesium iodide, magnesium bromate, magnesium bromite, magnesium chlorate, magnesium chlorite, magnesium chromate, magnesium sulfate, magnesium sulfite, $MgFeO_4$, $MgS_2O_3$, $Mg(MnO_4)_2$, $MgMoO_4$, and magnesium nitrate.

4. The process of claim 2, wherein said aqueous reactants are heated to a temperature of about 65° C. to about 80° C. prior to mixing and said magnesium salt is a salt of an organic acid selected from the group consisting of salts of fatty acids having from 1 to about 6 carbon atoms, selected from the group consisting of magnesium formate, acetate, propionate, butyrate, pentanoate, hexanoate, citrate or a salt of an aromatic acid, selected from the group consisting of magnesium benzoate, salicylate, and phthalate.

5. The process of claim 2, wherein said reactant mixture comprises about 30 to about 60 percent by weight of said mixture of reactants.

6. A magnesium hydroxide produced by the process of claim 1, having a particle size distribution in which about 90% of said particles are less than about 3.5 microns.

7. A magnesium hydroxide produced by the process of claim 1 utilizing ultrasonic mixing means and having a median particle size of about 0.7 micron, and a particle size distribution in which about 80% of said particles are within about 0.3 to about 1.4 microns.

8. Solid particles of magnesium hydroxide produced by the process of claim 1 and coated with an anionic surface active agent, said magnesium hydroxide having a particulate, crystalline structure characterized predominantly as fine, plate-like form, a unit layer thickness of 30 to 200 Angstroms, a median particle size of up to about 0.7 micron, and a particle size distribution in which about 80% of said particles are within about 0.3 to about 1.4 microns.

9. A thermoplastic synthetic resin composition containing magnesium hydroxide produced by the process of claim 1 and, coated or uncoated with an anionic surface active agent, said magnesium hydroxide having a particulate, crystalline structure characterized predominantly as fine, plate-like form, a unit layer thickness of 30 to 200 Angstroms, having a median particle size of up to about 1 micron, and a particle size distribution i which 80% of said particles are within about 0.3 to about 1.4 microns.

10. The composition of claim 9, wherein said magnesium hydroxide, when coated, is coated with an anionic surfactant selected from the group consisting of the alkali metal salts of higher fatty acids of the formula

RCOOM wherein R represents an alkyl group containing 8 to about 30 carbon atoms, and M represents an alkali metal atom, alkyl sulfate salts of the formula $ROSO_3M$ wherein R and M are the same as defined above, alkyl sulfonate salts of the formula $RSO_3M$ wherein R and M are the same as defined above, alkylaryl sulfonate salts of the formula R-aryl-$SO_3M$ wherein R and M are the same as defined above, and sulfosuccinate ester salts of the formula $$\begin{array}{l} ROCOCH_2 \\ | \\ ROCOCHSO_3M \end{array}$$

wherein R and M are the same as defined above.

* * * * *